(12) United States Patent
Doherty et al.

(10) Patent No.: US 12,253,205 B1
(45) Date of Patent: Mar. 18, 2025

(54) THERMAL TRANSFER LINE ASSEMBLIES, METHODS OF MANUFACTURING THERMAL TRANSFER LINE ASSEMBLIES, AND THERMAL TRANSFER METHODS

(71) Applicant: Montana Instruments Corporation, Bozeman, MT (US)

(72) Inventors: Josh Doherty, Bozeman, MT (US); William Baker, Bozeman, MT (US); Joseph Evers, Bozeman, MT (US); Ben Hardesty, Belgrade, MT (US); Jamesen Motley, Bozeman, MT (US); Anjan Reijnders, Bozeman, MT (US); Caleb Schreibeis, Bozeman, MT (US)

(73) Assignee: Montana Instruments Corporation, Bozeman, MT (US)

( * ) Notice: Subject to any disclaimer, the term of this patent is extended or adjusted under 35 U.S.C. 154(b) by 989 days.

(21) Appl. No.: 16/586,599

(22) Filed: Sep. 27, 2019

Related U.S. Application Data (60) Provisional application No. 62/738,759, filed on Sep. 28, 2018.

(51) Int. Cl.
  *F16L 59/065* (2006.01)
  *F16L 59/08* (2006.01)
  *F16L 59/14* (2006.01)

(52) U.S. Cl.
  CPC ............ *F16L 59/065* (2013.01); *F16L 59/08* (2013.01); *F16L 59/141* (2013.01)

(58) Field of Classification Search
  CPC ........ F16L 59/065; F16L 59/08; F16L 59/141
  (Continued)

(56) References Cited

U.S. PATENT DOCUMENTS

| 2,793,757 A | 5/1957 | McWethy |
| 3,236,334 A | 2/1966 | Wallerstein, Jr. |

(Continued)

FOREIGN PATENT DOCUMENTS

| CN | 103901232 | 7/2014 |
| CN | 107906844 A | 4/2018 |

(Continued)

OTHER PUBLICATIONS

Majorana et al., "Vibration Free Cryostat for cooling suspended mirrors", Journal of Physics: Conference Series 32, (2006), pp. 374-379.

(Continued)

*Primary Examiner* — David R Deal
(74) *Attorney, Agent, or Firm* — Wells St. John P.S.

(57) ABSTRACT

Thermal transfer line assemblies as well as methods for manufacturing thermal transfer line assemblies, and methods for transferring thermal energy are provided. In at least one embodiment a thermal transfer line assembly is provided that can include: a vacuum housing; a suspension support housing within the vacuum housing; a thermal conduit within the suspension support housing; in at least one cross section, a continuous outer void between the vacuum housing and the suspension support housing, an inner void between the suspension support housing and the thermal conduit; and a suspension system within the inner void and coupled to the suspension support housing but mechanically disconnected from the thermal conduit.

18 Claims, 7 Drawing Sheets

(58) Field of Classification Search
USPC .......... 138/108, 112, 120, 148, 149; 62/50.7
See application file for complete search history.

(56) References Cited

U.S. PATENT DOCUMENTS

| | | | |
|---|---|---|---|
| 3,444,365 A | 5/1969 | Loebe | |
| 3,595,275 A * | 7/1971 | Steans | F16L 59/153 |
| | | | 138/148 |
| 3,894,403 A | 7/1975 | Longsworth | |
| 3,910,277 A * | 10/1975 | Zimmer | A61B 18/02 |
| | | | 138/120 |
| 3,929,516 A | 12/1975 | Cheskis et al. | |
| 4,011,732 A * | 3/1977 | Doherty | F16L 39/005 |
| | | | 62/50.7 |
| 4,036,617 A * | 7/1977 | Leonard | F16L 7/00 |
| | | | 62/50.7 |
| 4,161,747 A | 7/1979 | Jennings | |
| 4,279,127 A | 7/1981 | Longsworth | |
| 4,303,105 A * | 12/1981 | Rohner | F16L 59/141 |
| | | | 138/113 |
| 4,360,087 A | 11/1982 | Curwen | |
| 4,415,184 A * | 11/1983 | Stephenson | E21B 36/003 |
| | | | 285/47 |
| 4,745,761 A | 5/1988 | Bazaj et al. | |
| 4,757,261 A | 7/1988 | Kneip, Jr. | |
| 4,854,131 A | 8/1989 | Sakitani et al. | |
| 4,869,068 A | 9/1989 | Van Vloten | |
| 4,968,663 A | 11/1990 | Whang | |
| 5,099,650 A | 3/1992 | Crunkleton | |
| 5,129,232 A | 7/1992 | Minas et al. | |
| 5,148,896 A | 9/1992 | Ralph | |
| 5,327,733 A | 7/1994 | Boolchand et al. | |
| 5,345,769 A | 9/1994 | Liepert et al. | |
| 5,349,823 A | 9/1994 | Solomon | |
| 5,410,910 A | 5/1995 | Somlyo et al. | |
| 5,552,608 A | 9/1996 | Gallagher et al. | |
| 5,613,367 A | 3/1997 | Chen | |
| 5,628,195 A | 5/1997 | Hill et al. | |
| 5,647,228 A | 7/1997 | Sager et al. | |
| 5,737,927 A | 4/1998 | Takahashi et al. | |
| 5,749,243 A | 5/1998 | Lester | |
| 5,889,456 A | 3/1999 | Triebe et al. | |
| 5,936,499 A | 8/1999 | Eckels | |
| 5,996,638 A * | 12/1999 | Schippl | F16L 59/141 |
| | | | 138/108 |
| 6,005,964 A | 12/1999 | Reid et al. | |
| 6,196,005 B1 | 3/2001 | Stautner | |
| 7,430,871 B2 | 10/2008 | Strobel | |
| 7,628,536 B2 | 12/2009 | Umemura | |
| 7,932,733 B2 | 4/2011 | Sasajima et al. | |
| 8,066,429 B2 | 11/2011 | Danley | |
| 8,114,321 B2 | 2/2012 | Johnson | |
| 8,746,008 B1 | 6/2014 | Mauritsen et al. | |
| 8,756,941 B2 | 6/2014 | Snow et al. | |
| 9,134,047 B2 | 9/2015 | Black et al. | |
| 9,243,726 B2 * | 1/2016 | Reid | F16L 9/14 |
| 9,303,914 B2 | 4/2016 | Mauritsen et al. | |
| 9,458,969 B2 | 10/2016 | Prester et al. | |
| 9,618,257 B2 | 4/2017 | Black et al. | |
| 9,620,272 B2 | 4/2017 | Nakayama | |
| 9,821,421 B2 | 11/2017 | Mauritsen et al. | |
| 10,165,667 B1 | 12/2018 | Christiansen et al. | |
| 10,451,529 B2 | 10/2019 | Schreibeis et al. | |
| 10,775,285 B1 | 9/2020 | Baker et al. | |
| 10,785,891 B1 | 9/2020 | Monroe et al. | |
| 11,125,663 B1 | 9/2021 | Henslee et al. | |
| 11,480,299 B1 | 10/2022 | Najafi-Yazdi et al. | |
| 2005/0126187 A1 | 6/2005 | Li et al. | |
| 2005/0140959 A1 | 6/2005 | Tsuji et al. | |
| 2005/0204748 A1 | 9/2005 | Yamanaka et al. | |
| 2006/0148276 A1 | 7/2006 | Renaudin | |
| 2007/0234751 A1 | 10/2007 | Nagamune | |
| 2007/0271933 A1 | 11/2007 | Miki | |
| 2007/0278719 A1 | 12/2007 | Adachi et al. | |
| 2008/0315090 A1 | 12/2008 | Nakasuji et al. | |
| 2009/0212890 A1 | 8/2009 | Saho et al. | |
| 2009/0224788 A1 | 9/2009 | Sasajima et al. | |
| 2009/0272127 A1 | 11/2009 | Radovinsky et al. | |
| 2010/0050661 A1 | 3/2010 | Snow et al. | |
| 2011/0219785 A1 | 9/2011 | Black et al. | |
| 2012/0011859 A1 | 1/2012 | Black et al. | |
| 2012/0031110 A1 | 2/2012 | Tanaka | |
| 2013/0047633 A1 | 2/2013 | Leach et al. | |
| 2014/0007596 A1 | 1/2014 | Prester et al. | |
| 2014/0130520 A1 | 5/2014 | Snow et al. | |
| 2014/0202174 A1 | 7/2014 | Wang | |
| 2014/0248649 A1 | 9/2014 | Mayer et al. | |
| 2015/0248002 A1 | 9/2015 | Ingersoll et al. | |
| 2015/0252799 A1 | 9/2015 | Roscher | |
| 2015/0300719 A1 | 10/2015 | Strickland et al. | |
| 2015/0323626 A1 | 11/2015 | Jonas et al. | |
| 2015/0332829 A1 | 11/2015 | Stautner et al. | |
| 2015/0338151 A1 | 11/2015 | Miki | |
| 2017/0168121 A1 | 6/2017 | Yu et al. | |
| 2017/0261413 A1 | 9/2017 | Schreibeis et al. | |
| 2017/0323764 A1 | 11/2017 | Muto et al. | |
| 2019/0025166 A1 | 1/2019 | Schreibeis et al. | |
| 2019/0170621 A1 | 6/2019 | Doherty et al. | |
| 2020/0109764 A1 | 4/2020 | Motley et al. | |
| 2020/0149686 A1 | 5/2020 | Neils et al. | |
| 2020/0265963 A1 | 8/2020 | Wong | |
| 2021/0278745 A1 | 9/2021 | Groeblacher et al. | |
| 2021/0326739 A1 | 10/2021 | Jeffrey | |
| 2022/0092459 A1 | 3/2022 | Bogorin et al. | |
| 2022/0237495 A1 | 7/2022 | Yohannes et al. | |
| 2023/0155593 A1 | 5/2023 | Abdo et al. | |

FOREIGN PATENT DOCUMENTS

| | | |
|---|---|---|
| DE | 102018130882 A1 | 6/2019 |
| EP | 0619440 | 10/1994 |
| FR | 3023900 A1 | 1/2016 |
| GB | 2457054 A | 8/2009 |
| GB | 2566024 A | 3/2019 |
| JP | 05059503 A | 3/1993 |
| JP | H06-341487 A | 12/1994 |
| WO | WO 2018/168304 | 2/2018 |
| WO | PCT/US2019/55449 | 1/2020 |

OTHER PUBLICATIONS

Mueller Copper 1100 (Electrolytic Tough Pitch Copper), Alloy Digest, 1983, 2 pages.

Snow, U.S. Appl. No. 61/136,138, filed Aug. 14, 2008, titled "Apparatus(es) & Methods for Improving Vibration Isolation, Thermal Dampening, Optical Access in Cryogenic Refrigerators", 18 pages.

White, G.K., "The Thermal And Electrical Conductivity of Copper At Low Temperatures", 1953, pp. 398-404.

* cited by examiner

THERMAL TRANSFER LINE ASSEMBLIES, METHODS OF MANUFACTURING THERMAL TRANSFER LINE ASSEMBLIES, AND THERMAL TRANSFER METHODS

CROSS REFERENCE TO RELATED APPLICATION

This application claims priority to and the benefit of U.S. Provisional Patent Application Ser. No. 62/738,759 filed Sep. 28, 2018, entitled "Thermal Transfer Line Assemblies and Thermal Transfer Methods", the entirety of which is incorporated by reference herein.

TECHNICAL FIELD

The present disclosure provides assemblies and methods that can be used to transfer thermal energy between a mass and a thermal source or sink. Example implementations of the present disclosure provide thermal transfer line assemblies and/or thermal transfer methods.

BACKGROUND

Thermal transfer is used to transfer thermal energy between a mass and a thermal source or sink. Using a thermal transfer line assembly, the mass can be heated or cooled. Particular technologies require providing low temperatures to a specific mass or multiple masses. To provide these low temperatures, a cold source, or thermal sink is provided that can be anything from a cooling bath to a cryocooler. Heat from the mass or masses is transferred from the mass or masses to the cold source or thermal sink via a thermal transfer line, thus lowering the temperature of the mass or masses. Isolating the transfer line from environmental temperatures can reduce the thermal load on the cold source and increase the efficiency of heat removal from the mass or masses. The present disclosure provides thermal transfer line assemblies and methods that can, in accordance with example implementations, reduce the thermal load on the cold source and/or increase efficiency of heat removal.

SUMMARY

Thermal transfer line assemblies are provided that can include: a vacuum housing; a suspension support housing within the vacuum housing; a thermal conduit within the suspension support housing; in at least one cross section, a continuous outer void between the vacuum housing and the suspension support housing, wherein the vacuum housing is disconnected from the suspension support housing in the one cross section; and in the one cross section, an inner void between the suspension support housing and the thermal conduit.

Methods for manufacturing a thermal transfer line assembly are also provided. The methods can include: providing a thermal conduit; providing a suspension support housing about the thermal conduit to define an inner void between the suspension support housing and the thermal conduit; and providing a vacuum housing about the suspension support housing to define an outer void between the vacuum housing and the suspension support housing.

Methods for transferring thermal energy are also provided. The methods can include transferring thermal energy via a thermal conduit within an inner void of a suspension support housing.

DRAWINGS

Embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

Figure 1:
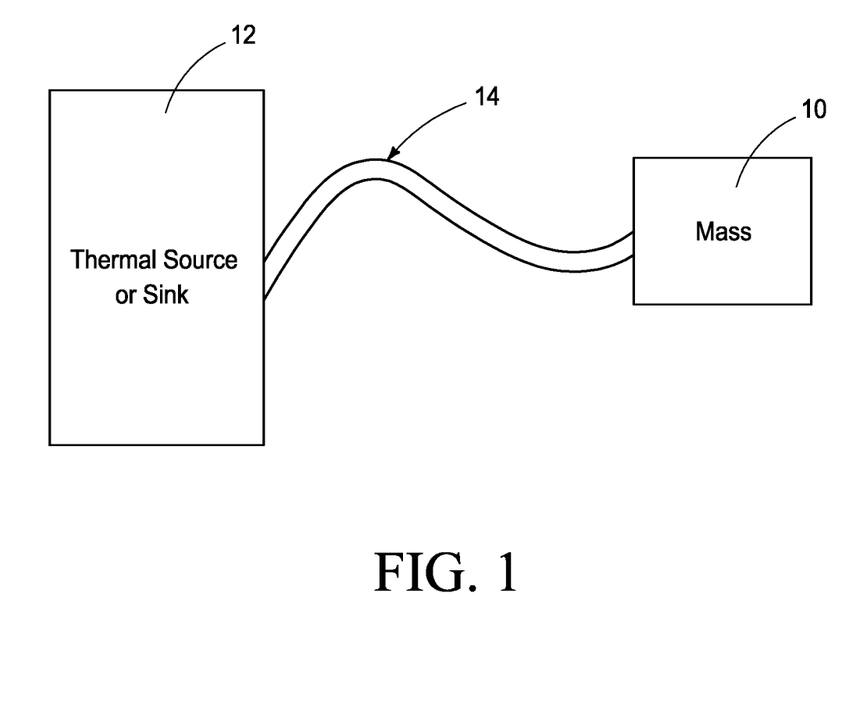
FIG. 1 is depiction of a thermal source or sink in operative configuration with a mass via a thermal transfer line according to an embodiment of the disclosure.

The assemblies and methods of the present disclosure will be described with reference to FIGS. 1-7. Referring first to FIG. 1, a block diagram of a mass 10 of interest in thermal communication with a thermal source or sink 12 via a thermal transfer line assembly 14 is depicted. Thermal transfer line assembly 14 of the present disclosure can provide significantly reduced heat load or loss and therefore better thermal transfer efficiency between thermal source or sink 12 and mass 10 of interest. Thermal transfer line assemblies 14 can also provide significantly reduced mechanical energy (vibration) transfer from thermal source or sink 12 to mass 10 of interest.

Figure 2A:
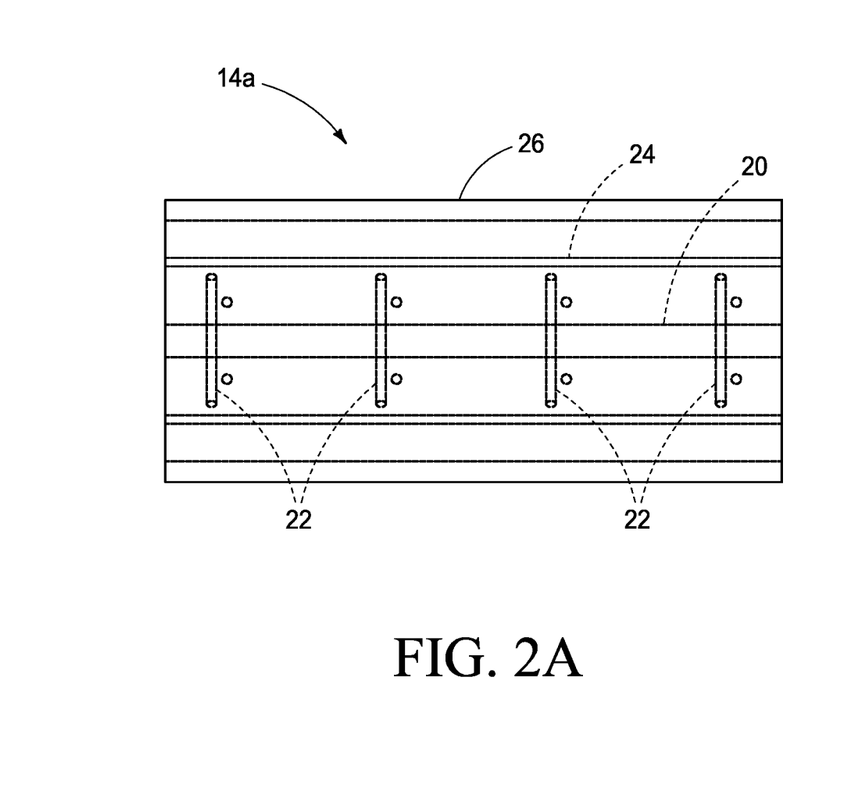
FIGS. 2A and 2B are both an elevational view and a cross sectional view of a thermal transfer line assembly according to an embodiment of the disclosure.
Figure 2B:
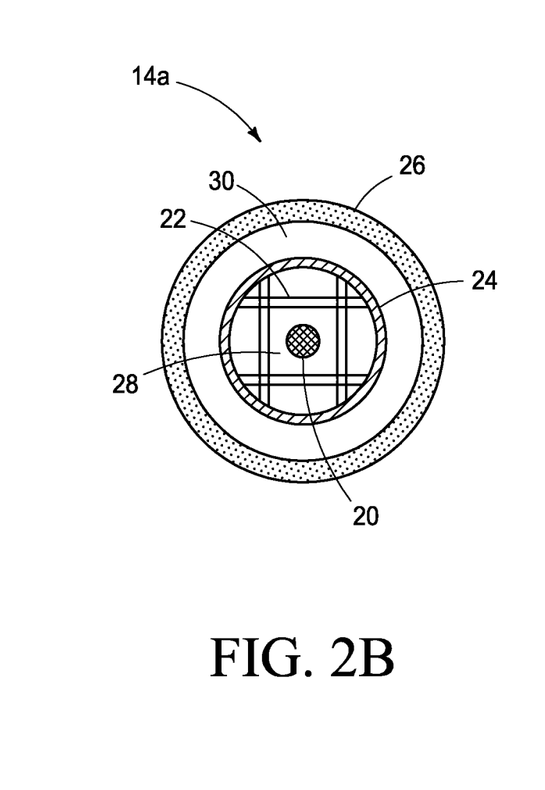

Referring to FIGS. 2A and 2B, an embodiment of a thermal transfer line assembly 14a is depicted that can include a thermal conduit 20, conduit suspension or suspension system 22, suspension support housing 24, and vacuum housing 26. Thermal conduit 20 can provide for the transfer of the thermal energy to/from thermal source or sink 12 to the mass 10 of interest. Thermal conduit 20 can conduct thermal energy via solid conduction, via copper bar, copper wire, or copper braid for example. Thermal conduit 20 may also be configured as a tube, pipe, or hose, such as a stainless steel tube, that can transfer a fluid, such as a cryogenic fluid, from thermal source or sink 12 to mass 10 of interest.

Suspension system 22 can be configured to suspend thermal conduit 20 within a space or inner void 28 within the surrounding structure which can include a suspension support housing 24, shielded or unshielded. Suspension system 22 can limit physical contact, particularly thermal contact, between thermal conduit 20 and any surrounding structure, thus minimizing conductive heat transfer to/from the thermal conduit at its surrounding environment. In accordance example implementations, in at least one cross section (e.g., FIGS. 2B and 3B), there can be a continuous outer void 30 between vacuum housing 26 and suspension support housing 24. As an example, this outer void can be continuous disconnecting suspension support housing 24 from vacuum housing 26. In accordance with at least some of these implementations, thermal conduit 20 can float inside suspension support housing 24 and/or in accordance with other implementations within suspension system 22. In accordance with at least some of these embodiments, mechanical contact between thermal conduit 20 and any surrounding structure is minimized and/or eliminated, thus minimizing the transfer of mechanical energy to thermal conduit 20 from its surrounding environment. Suspension system 22 can be constructed of thread (such as nylon floss) or wire that is attached at discrete locations along the length of suspension support housing 24 in a manner that creates an inner cage around thermal conduit 20. Suspension system 22 may also include spacers between thermal conduit 20 and suspension support housing 24 that are chosen of specific geometry and material to minimize heat transfer and transfer of mechanical energy to/from thermal conduit 20. Suspension support housing 24 may limit the motion of thermal conduit 20 within transfer line assembly 14. Suspension support housing 24 can be any type of hose or tube, made of Teflon for example, that is not brittle at low temperatures for cryogenic applications.

Vacuum housing 26 can provide an evacuated space in which thermal conduit 20, suspension system 22, and/or suspension support housing 24 can be located, as to minimize convective or conductive heat transfer to/from thermal conduit 20. Vacuum housing 26 can be any type of hose, tube, or structure that can support an interior vacuum pressure. Vacuum housing 26 can be configured as bellows, and in particular embodiments, edge welded bellows. The ability to be bent, flexed, or twisted is desirable for transfer line assembly 14, and materials of construction may be chosen accordingly.

Figure 3A:
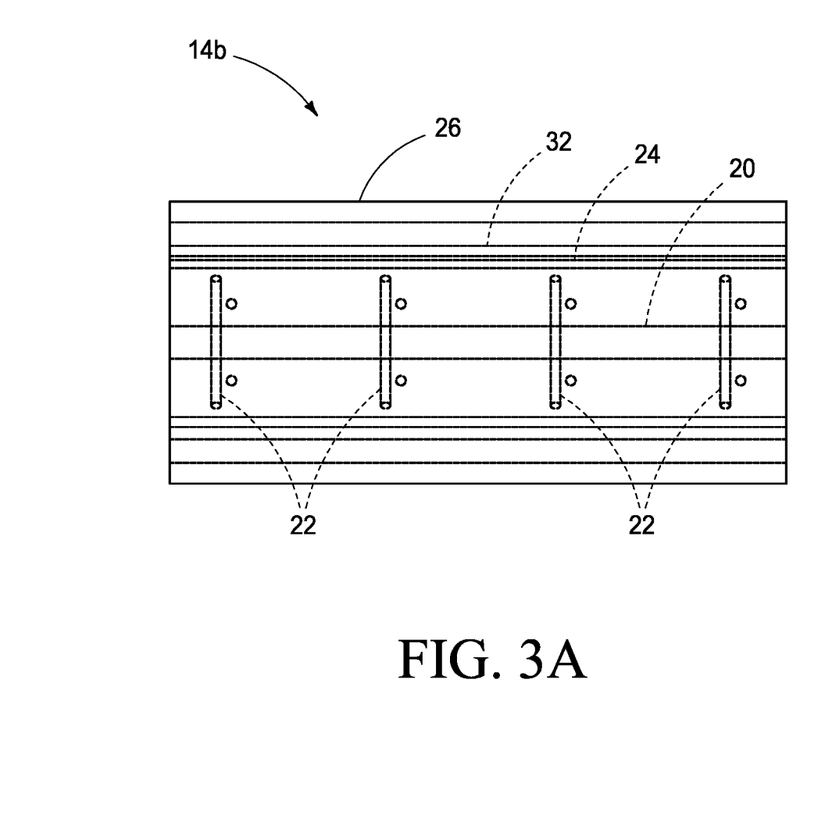
FIGS. 3A and 3B are both an elevational view and a cross sectional view of a thermal transfer line assembly according to an embodiment of the disclosure.
Figure 3B:
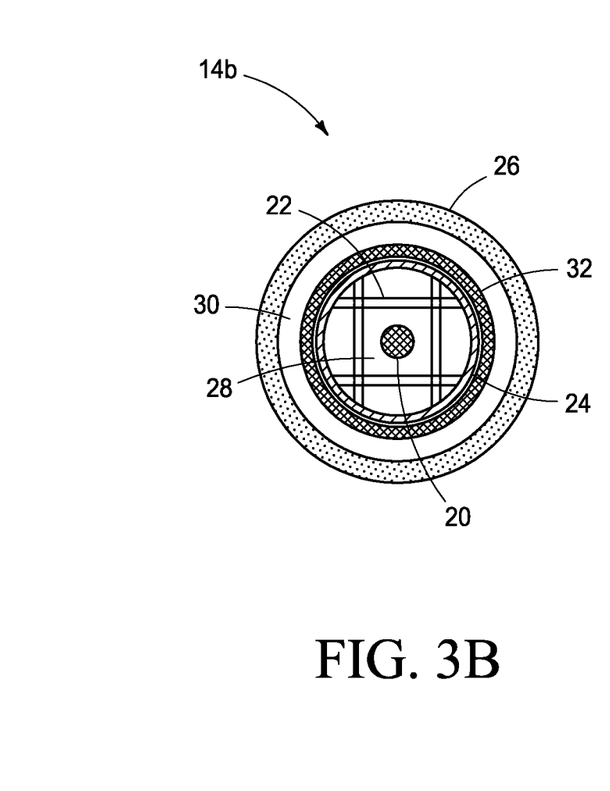

Referring next to FIGS. 3A and 3B, a thermal transfer line assembly 14b can include a radiation shield member 32. In one embodiment, radiation shield member 32 can extend the length of thermal transfer line assembly 14b and can shield thermal conduit 20 from radiative heat transfer to/from thermal conduit 20 to the surroundings. Radiation shield member 32 can be flexible, for example, and can be constructed of one or more multiple layers of copper braid that defines a space for suspension support housing 24 and suspension system 22. Radiation shield member 32 may also be rigid or semi-rigid. Radiation shield member 32 can also be a rigid copper tube, for example, or radiation shield member 32 may be semi-rigid and configured of sections of rigid copper tube separated by sections of copper bellows soldered to the rigid section ends.

In one embodiment, thermal transfer line assembly 14 may also comprise multi-layer insulation (MLI) or super insulation that can minimize radiative and conductive heat transfer to/from the surrounding environment to thermal conduit 20 and/or or radiation shield member 32. This insulation can be provided to within outer void 30, for example.

Figure 4:
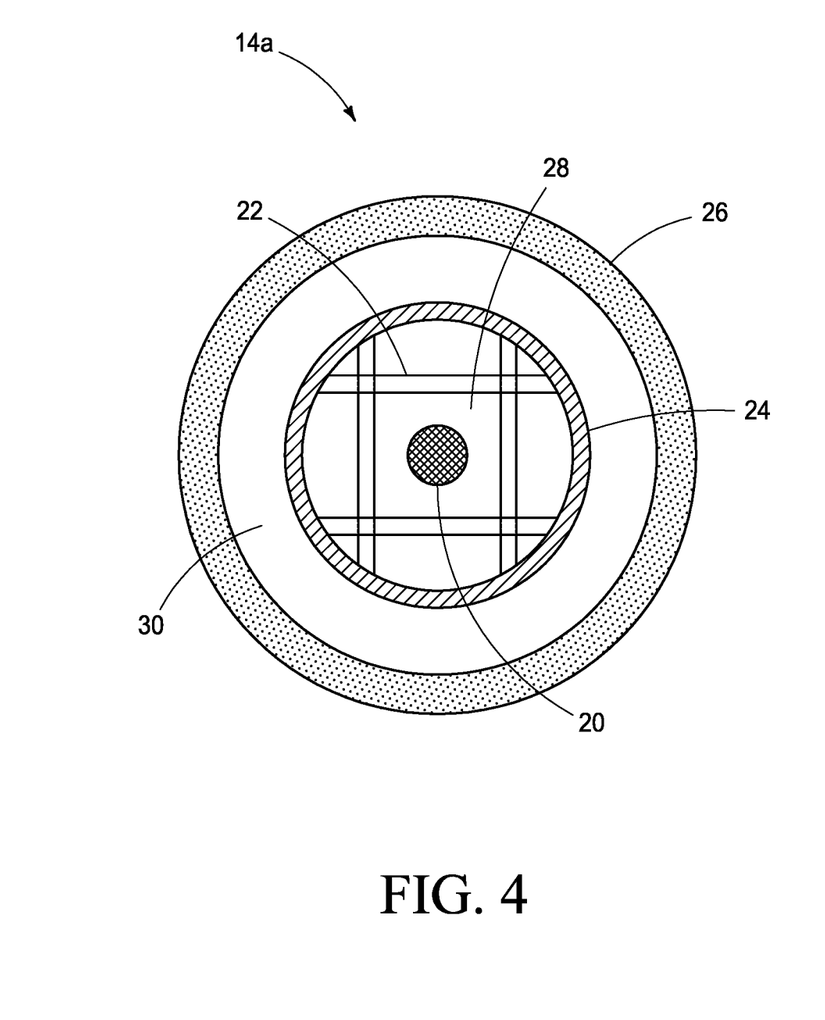
FIG. 4 is a cross sectional view of a thermal transfer line assembly according to an embodiment of the disclosure.

Referring next to FIG. 4, suspension system 22 can be constructed of a cage of floss or thread. In this embodiment, suspension support housing 24 can have small holes positioned around the circumference that the floss or thread can be threaded through and then tied, creating a grid of floss/thread about thermal conduit 20. These holes and suspension system 22 can be positioned at multiple discrete locations along the length of the suspension support.

Figure 5:
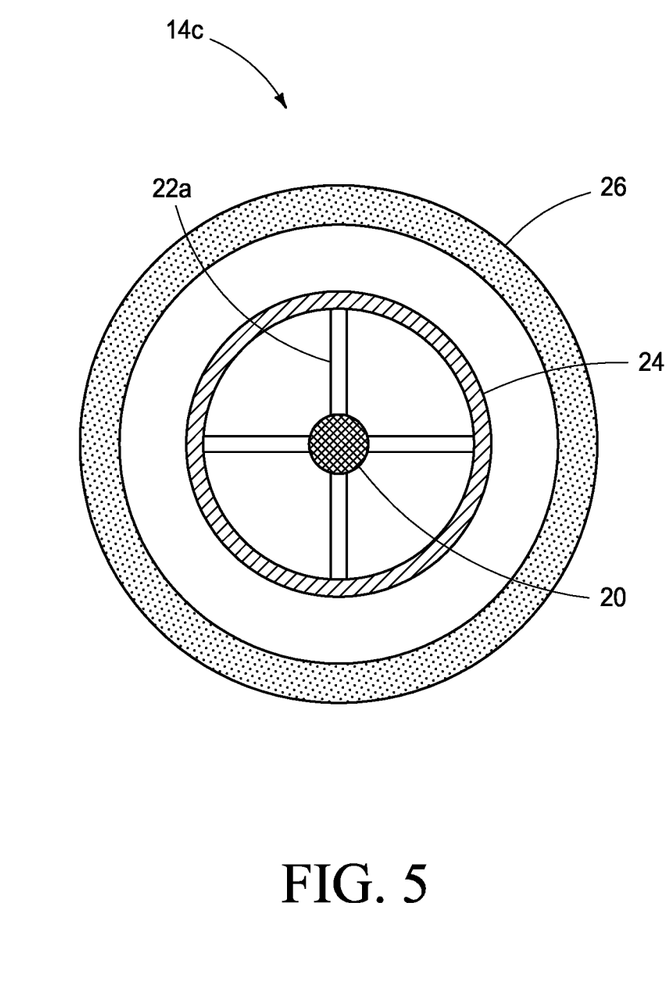
FIG. 5 is a cross sectional view of a thermal transfer line assembly according to an embodiment of the disclosure.

Referring next to FIG. 5, an assembly 14c is shown with a suspension system 22a constructed of floss or thread attached to thermal conduit 20 at multiple locations and configured to suspend thermal conduit 20 about the center of suspension support housing 24. Here, suspension support housing 24 can have small holes positioned around the circumference that the floss or thread can be threaded through and tied. These holes and system 22a can be positioned at multiple discrete locations along the length of suspension support housing 24. In accordance with this implementation, less suspension structure can provide additional thermal isolation. In accordance with this implementation, system 22a can connect housing 24 and conduit 20, but infrequently, thus still providing substantial thermal isolation.

Figure 6:
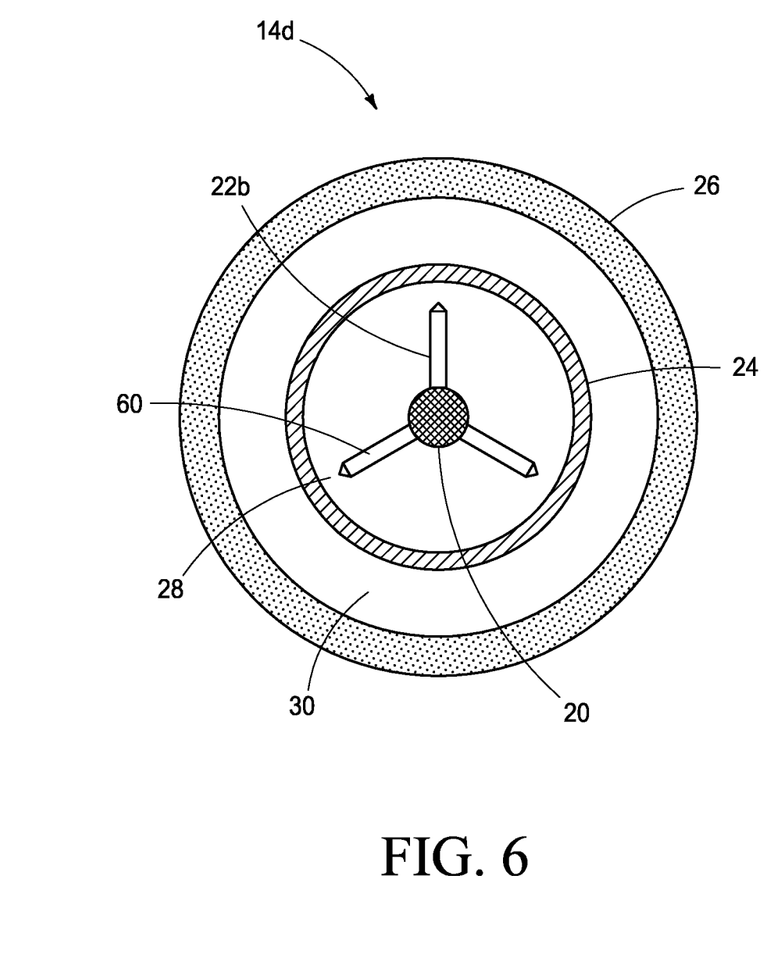
FIG. 6 is a cross sectional view of a thermal transfer line assembly according to an embodiment of the disclosure.

With reference to FIG. 6, an assembly 14d having a suspension system 22b is shown that can be constructed of small length needles 60 attached to and arranged around a circumference of thermal conduit 20, as spokes from a hub, for example. Here, two of the three needles 60 may be in thermal contact with the suspension support housing 24 at one time, while at others, and in accordance with the shown cross section, both conduit 20 and system 22b float within void 28 defined by housing 24. Needles 60 can be positioned at multiple discrete locations along the length of suspension support housing 24. Needles 60 can have beveled, narrow, or even sharp tips that provide small point contacts between thermal conduit 20 and suspension support housing 24.

In accordance with at least one implementation, thermal transfer line assemblies 14 can be flexible, allowing the mass 10 of interest to be moved in position relative to the thermal sink or source 12. Accordingly, suspension systems 22, suspension support housing 24, thermal conduit 20, vacuum housing 26, and/or possibly radiation shield 32 may be individually flexible. To minimize the transfer of mechanical energy to mass 10 of interest, in one implementation, suspension systems 22, suspension support housing 24, thermal conduit 20, vacuum housing 26, and/or possibly radiation shield 32 are mechanically de-coupled (loosely connected). In accordance with another implementation, thermal transfer line assembly 14 may be utilized to maintain multiple masses of interest at potentially different temperatures. Accordingly, thermal transfer line assembly 14 may include more than one thermal conduit 20, suspension system 22, suspension support housing 24, and/or radiation shield 32.

Figure 7:
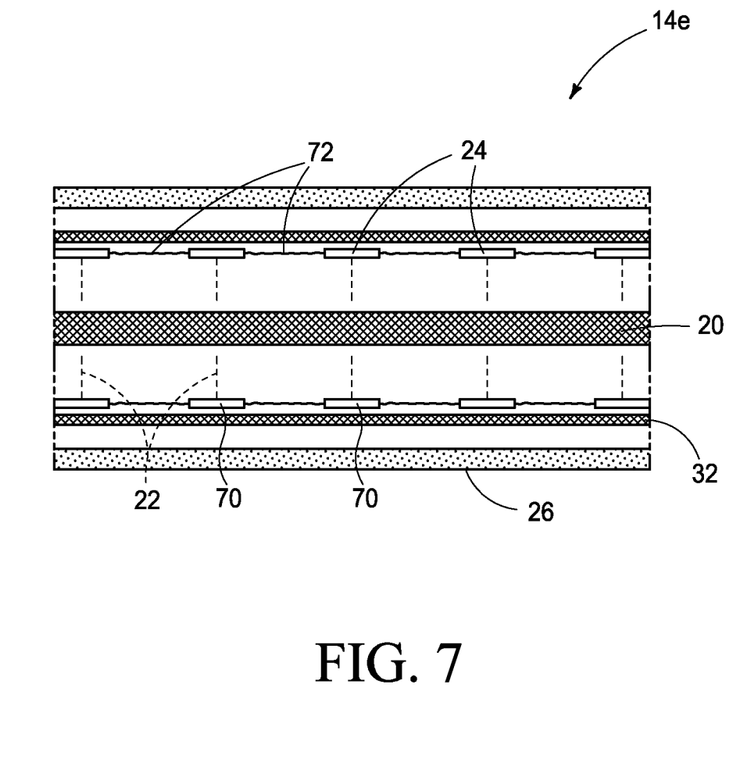
FIG. 7 is an elevational view of a thermal transfer line assembly according to an embodiment of the disclosure.

Referring to FIG. 7, in accordance with another implementation, assembly 14e is shown that includes suspension support housing 24 that is defined by a plurality of sections 70 along the length of thermal transfer line assembly 14e that are loosely connected, thermally and mechanically, as to minimize the transfer of thermal and/or mechanical energy from one section to the next. Suspension support housing 24, defined by multiple sections 70, can be constructed of metal, such as aluminum, or plastic sections that are loosely connected with members 72. Sections 70 can be less elastic than members 72. For example, members 72 can be constructed of Nylon or Kevlar thread.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

The invention claimed is:
1. A thermal transfer line assembly comprising:
a vacuum housing;
a suspension system support housing within and mechanically disconnected from the vacuum housing;
a thermal conduit within the suspension system support housing;

in at least one cross section, a continuous outer void between the vacuum housing and the suspension system support housing;

in the at least one cross section, an inner void between the suspension system support housing and the thermal conduit, wherein the thermal conduit defines an exterior and the entirety of the exterior of the thermal conduit is within the inner void and is mechanically disconnected from the suspension system support housing; and a suspension system comprising insulative members within the inner void and coupled to the suspension system support housing and mechanically disconnected from the thermal conduit, the suspension system support housing defining an interior surface that defines an inner void perimeter, wherein an entirety of the thermal conduit is within the inner void perimeter.

2. The thermal transfer line assembly of claim 1 wherein the suspension system support housing is defined by a plurality of segmented portions.

3. The thermal transfer line assembly of claim 2 further comprising a radiation shield member about the suspension system support housing.

4. The thermal transfer line assembly of claim 3 wherein the radiation shield member is contiguous between the segments of the suspension system support housing.

5. The thermal transfer line assembly of claim 3 further comprising a plurality of individual members connecting the plurality of segmented portions.

6. The thermal transfer line assembly of claim 5 wherein the segmented portions are less elastic than the individual members.

7. The thermal transfer line assembly of claim 1 wherein the thermal conduit resides within the inner void and is mechanically disconnected from the suspension system support housing in the at least one cross section.

8. The thermal transfer line assembly of claim 1 wherein the thermal conduit defines an exterior and the entirety of the exterior of the thermal conduit is within the inner void perimeter.

9. The thermal transfer line assembly of claim 8 wherein an entirety of the insulative members is within the inner void perimeter.

10. A method for manufacturing a thermal transfer line assembly, the method comprising:

providing a thermal conduit;

providing a suspension system support housing about the thermal conduit to define an inner void between the suspension support housing and the thermal conduit;

providing a vacuum housing about the suspension system support housing to define an outer void between the vacuum housing and the suspension support housing; and providing a suspension system comprising insulative members within the inner void, wherein the suspension system is mechanically disconnected from the thermal conduit, wherein the thermal conduit defines an exterior and the entirety of the exterior of the thermal conduit is within the inner void and is mechanically disconnected from the suspension system support housing, the suspension system support housing defining an interior surface that defines an inner void perimeter, and wherein an entirety of the thermal conduit is within the inner void perimeter.

11. The method of claim 10 wherein the thermal conduit is a solid material that is thermally conductive.

12. The method of claim 10 wherein the thermal conduit is tubular and configured to convey a fluid.

13. The method of claim 10 further comprising providing a radiation shield member about the suspension support housing.

14. The method of claim 10 wherein the method includes segmenting portions of the suspension support housing.

15. The method of claim 14 wherein the method includes linking the segmented portions via a plurality of members.

16. The method of claim 10 wherein the thermal conduit resides within the inner void and is mechanically disconnected from the suspension system support housing in the at least one cross section.

17. The method of claim 10 wherein the thermal conduit defines an exterior and the entirety of the exterior of the thermal conduit is within the inner void perimeter.

18. The method of claim 17 wherein an entirety of the insulative members is within the inner void perimeter.

* * * * *